United States Patent [19]

Newsome

[11] Patent Number: 4,610,914
[45] Date of Patent: Sep. 9, 1986

[54] ORIENTED FILMS OF BLENDS OF EVOH COPOLYMER

[75] Inventor: David L. Newsome, Neenah, Wis.

[73] Assignee: American Can Company, Greenwich, Conn.

[21] Appl. No.: 632,675

[22] Filed: Jul. 19, 1984

Related U.S. Application Data

[63] Continuation of Ser. No. 290,172, Aug. 5, 1981, abandoned.

[51] Int. Cl.[4] .............................................. B32B 7/02
[52] U.S. Cl. ............................... 428/216; 428/35; 428/516; 428/520; 428/522; 428/910; 525/75
[58] Field of Search .............. 428/35, 520, 515, 516, 428/518, 522, 910, 216; 525/75

[56] References Cited

U.S. PATENT DOCUMENTS

| 3,560,325 | 2/1971 | Sogi | 428/216 |
|---|---|---|---|
| 3,931,449 | 1/1976 | Hirata et al. | 428/520 |
| 4,064,296 | 12/1977 | Bornstein et al. | 428/35 |
| 4,135,026 | 1/1979 | Hoyt et al. | 428/220 |
| 4,239,826 | 12/1980 | Knott et al. | 428/520 |
| 4,240,993 | 12/1980 | Sun | 264/22 |
| 4,247,584 | 1/1981 | Widiger | 428/35 |
| 4,261,473 | 4/1981 | Yamada et al. | 428/35 |
| 4,281,045 | 7/1981 | Sumi et al. | 428/520 |
| 4,362,844 | 12/1982 | Lemstra et al. | 525/57 |

FOREIGN PATENT DOCUMENTS

| 79267 | 6/1980 | Japan | 428/910 |
|---|---|---|---|
| 1561790 | 3/1980 | United Kingdom . | |

Primary Examiner—Edith Buffalow
Attorney, Agent, or Firm—Stuart S. Bowie; Thomas D. Wilhelm

[57] ABSTRACT

A highly desirable blend has ethylene vinyl alcohol copolymer blended with a thermoplastic polymer composition. Preferred blends are compatible when the blend is formed into a film and oriented. The invention contemplates the blend composition, the blend composition incorporated into a film, an oriented film, a multiple layer oriented film, a method of making the film, and the film formed into a shrink bag.

29 Claims, 1 Drawing Figure

ORIENTED FILMS OF BLENDS OF EVOH COPOLYMER

This application is a continuation of application Ser. No. 290,172 filed Aug. 5, 1981, abandoned.

It is conventionally known that some plastic films can be molecularly oriented by heating the film to a temperature below the melting temperature of the film and stretching the film while it is thus heated. After the film is stretched, it is cooled while being held in the stretched state. Once the film is cooled it is, in general, dimensionally stable until it is reheated to near the orientation temperature, whereupon it may, advantageously, shrink, such as about a product enclosed in a containing film.

BACKGROUND OF THE INVENTION

Heat shrinkable polymer films have gained substantial acceptance for such uses as the packaging of meats. This description will detail the usage of films for packaging meat; it being understood that these films are also suitable for packaging other products. Some of the films embodying this invention are normally used as heat shrinkable bags supplied to the meat packer with one open end, to be closed and sealed after insertion of the meat. After the product is inserted, air is normally evacuated, the open end of the bag is closed, such as by heat sealing, or applying a metal clip, and finally heat is applied, such as by hot water, to initiate film shrinkage about the meat.

In subsequent processing of the meat, the bag may be opened and the meat removed for further cutting of the meat into user cuts, for retail sale, for example or for institutional use.

Successful shrink bags must satisfy a multiplicity of requirements imposed by both the bag producer and the bag user. Of primary importance to the bag user is the capability of the bag to survive physically intact the process of being filled, evacuated, sealed closed, and heat shrunk. The bag must also be strong enough to survive the material handling involved in moving the contained meat, which may weigh 100 pounds or more, along the distribution system to the next processor, or to the user. Thus, the bag must physically protect the meat.

It is also highly desirable to the bag user that the bag serve as a barrier to infusion of gaseous materials from the surrounding environment. Of particular importance is provision of an effective barrier to infusion of oxygen, since oxygen is well known to cause spoilage of meat. The bag should also be clear for product appeal purposes.

The bag producer requires a product which can be produced competitively while meeting the performance requirements of the user. Thus the bag material should be readily extrudable, and susceptible to orientation, with sufficient leeway in process parameters as to allow for efficient film production. The process should also be susceptible to efficient extended production operations. In the orientation process, the film must be tough enough to withstand the stretching. The orientation temperature should be a temperature which is economically achieved by the producer, and which provides for use of economical shrink processes by the bag user.

Conventional shrink bags have generally been constructed with ethylene vinyl acetate copolymers. In some cases the bags contain a layer of a saran copolymer to serve as an oxygen barrier. Ethylene vinyl alcohol copolymer (EVOH) has also been suggested as the barrier layer. EVOH, however, is moisture sensitive, is difficult to process into films, and is particularly brittle in the thin gauges associated with its most economical use.

Notwithstanding the advantages, shrink-bag packaging of meat is not without its difficulties, many of which are attributable to limitations inherent in the films presently available for such applications. As will be appreciated, the processes of stretching the film, and later shrinking it, expose the film to rather severe conditions, due to the nature of the operations.

It is especially important to appreciate that the film is particularly vulnerable to failure at conditions of operation, due to the relatively high temperatures to which it is exposed in the orientation and shrinking processes.

The film must be susceptible to orientation without distortion, or separation of the multiple layers which are normally present in films of this nature. The film must be strong enough, at the orientation temperature to withstand the stretching without the creation of holes, tears, or non-uniform zones of stretching.

In the case of blown tubular film, the film must be capable of supporting the stretching bubble during the orientation process. Finally, each of the layers of the film should be susceptible to orientation without fracture, separation, or creation of holes.

In packaging use, the film must respond to heat rapidly enough for commercial practicality, and yet must not exhibit such a level of shrink energy as would cause the film to pull apart or delaminate during shrinkage, under its own internal forces. Moreover, the shrink-related problems are seriously increased when the contained cut of meat includes protruding bones and/or significant depressions in its surface.

Conventionally available films having a saran layer suffer from a multiplicity of problems. Saran has a brown color, which is generally undesirable. During extended extruder operation, bits of carbon form in the extruder equipment, and later pass out through the die as undesired inclusions in the film. As a result, the operation must be shut down periodically for die cleaning. Finally, the power required to extrude Saran is relatively high. Thus, while saran is accepted as a function material, alternate barrier material choices are desirable.

Films containing an EVOH layer represent a partial improvement. Since EVOH does not suffer from carbon build-up, extended extruder operation is possible. Extruder power consumption is generally less. Also, the film may be colorless and clear with the elimination of the Saran.

However, the process of extruding and orienting a film containing an EVOH layer is rather sensitive to the processing parameters. Also the EVOH layer is susceptible to substantial changes in barrier properties on exposure to moisture.

SUMMARY

It has now been found, after extensive experimentation and testing, that certain improvements in polymer technology are attained in a multiple layer film having a first layer, the composition of the first layer being a blend of at least 40% of an EVOH copolymer, and no more than 60% of a blend material of thermoplastic polymeric composition, the first layer, in the oriented state, comprising a compatible blend composition; and a second polymeric layer in face to face contact with the first layer.

In some embodiments, the composition of the second layer is susceptible of coextrusion with the first layer.

The EVOH copolymer is preferrably at least about 35% ethylene.

The first layer is preferrably between about 5 gauge and about 50 gauge thickness.

The composition of the blend material is preferrably chosen from the group consisting of ethylene ethyl acrylate, ethylene acrylic acid, linear low density polyethylene, linear low density polyethylene copolymer, ionomer, anhydride modified polypropylene, anhydride modified ethylene vinyl acetate, anhydride modified low density polyethylene, anhydride modified medium density polyethylene, and anhydride modified high density polyethylene.

In general terms, the composition of the blend material in the first layer may include, as a molecular segment, a moiety of

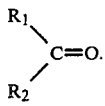

In preferred compositions $R_2$ is connected to the carbon atom through an oxygen linkage and $R_1$ may be aliphatic. Many of the preferred compositions of blend material contain carboxyl groups; with the preferred amount of carboxyl groups being at least 3% of the blend material. The carboxyl groups may be present in more than one form. A preferred form is organic anhydride.

The blend material is further characterized as having a melt index, compared to LDPE, of no more than about 10.

The composition of the second layer is preferrably an ethylene, or ethylene-derived polymer, and is most commonly chosen from the group consisting of ethylene vinyl acetate, high density polyethylene, low density polyethylene, ethylene propylene copolymer, linear low density polyethylene and linear low density polyethylene copolymer.

In a preferred form, the film has a third layer in face to face contact with the first layer on the opposite surface from the second layer, and all three layers are susceptible of coextrusion together.

The preferred film has a total thickness of between 1.5 mils and 3 mils, with the second layer comprising ethylene vinyl acetate copolymer, the third layer comprising ethylene vinyl acetate copolymer, and at least 50% of the thickness of the film comprising the third layer.

In its preferred application the invention contemplates use of the film in a biaxially oriented shrink bag made from a multiple layer film coextruded, and oriented, in tubular form.

DETAILED DESCRIPTION OF THE INVENTION

Figure 1:
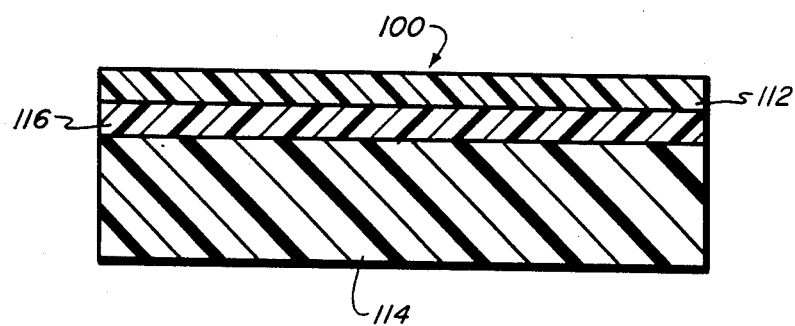
FIG. 1 is a cross-section of a film of this invention, showing the layers of a preferred structure.

Typical of multiple layer shrink films are those having three functional layers, such as the film shown in FIG. 1, wherein the entire multiple layer film is designated 100.

Layer 112 on the surface of the film serves as the exterior layer on a finished package. It is particularly important that this layer be tough and abuse resistant in order to adequately protect underlying layers, as well as the product itself. In tubular extrusion processes, such as are hereinafter described, the desired tough characteristics of layer 112 may also be beneficial in production of the film by resisting and containing internal tube pressures.

Layer 114 is characterized in its compatibility with the product to be packaged. If the packaging material is expected to have heat sealin characteristics—which many packaging materials are—layer 114 is the layer most useful for this purpose, and its polymer composition is carefully selected to serve this function.

Layer 116 is juxtaposed between layers 112 and 114, and is preferably adhered directly to them by at least modest adhesive forces. The function of layer 116 is to serve as a barrier to passage of gaseous material, and particularly oxygen, through the film.

The films described herein are of a generally thin, flexible, nature. All the oriented films in the examples are of the order of 1.5 to 4 mils thickness, also referred to as 150 to 400 gauge, wherein 100 gauge equals 1 mil thickness. It is anticipated that considerable variation in the overall film thickness can be tolerated within the description of the instant invention.

The films of the invention may be oriented using any suitable technique, which will depend on the exact structure of the film, the nature of its various components, and the end use anticipated for the oriented film product. In a typical process, the film is produced and oriented by the so called "double bubble" technique. As is well known, in such a process, the film may be extruded as a tube formed by an annular die and carried into a quenching zone, generally with cooling being applied to the outside surface of the tube. The tube is collapsed, then reheated to its orientation temperature, is stretched in the machine direction between two sets of nip rolls that are so rotated as to establish a linear rate differential therebetween, and is simultaneously oriented in the cross-machine direction as an inflated bubble trapped between the afore-mentioned nips. In accordance with known practice, the film is usually cooled by air, to below the orientation temperature in the orientation zone. For some applications where shrink characteristics are not necessary for the anticipated end use of the film, it may be desirable to anneal the oriented film, also known as heat setting, in a manner well known in the art.

One of the outstanding benefits that results from use of the blends-herein described is realized in connection with the above described "double bubble" orientation technique. Films containing layers of EVOH by itself have heretofore been most difficult to produce by blown bubble extrusion and orientation because the EVOH is very sensitive to conditions of processing. The instability of the bubble in experimental trials has significantly limited the thicknesses in which the films could be fabricated. On the other hand, in the blends described herein the range of parameters under which such extrusion and orientation can be carried out is extended considerably, thus rendering the process, and the provision of oriented films containing EVOH, much more practical from a commercial stand point. This is true, moreover, regardless of whether the film is of single layer construction or consists of a core of the EVOH blend with adjacent layers, which normally add toughness and strength and thereby help to support the bubble, enabling it to better withstand internal pressures.

With the known brittle nature of EVOH resins, the primary source of strength in the bubble is in those components of the film which are not EVOH. These components advantageously include those materials blended into the EVOH blend layer and, in multiple layer structures, also include those layers which do not contain EVOH. The process-related penalty of improper choice of polymer materials, or of improper processing conditions is, of course, inability to establish and maintain a stable orientation bubble. It has been found that it is in fact desirable to subject the film to a reheat temperature of at least 208° F. in order to minimize the stiffness of the EVOH layer. This provides improved success with establishment and maintenance of a stable, trouble-free bubble. Preferrably, the reheat temperature is maintained at 210° F. or higher in order to further soften the EVOH and thereby minimize the effective brittleness contributed by the EVOH component.

In view of the fact that the films of the invention comprise a large family of possible combinations, it is difficult to precisely define or predict the temperature ranges within which orientation will be achieved most effectively for any specific film structure. While this parameter will, therefore, be determined empirically for any given film, it may be noted by way of example that typical orientation temperatures will range from about 180° to about 250° Farenheit. The thickness of the EVOH-containing layer also determines, to some degree, the optimum orientation temperature, with thicker layers requiring higher temperature in order to effect proper softening of the EVOH material in modification of its brittle nature.

Even higher temperatures are desirable for some film structures. Given the requirement to soften the tube enough that it can be stretched, and given the known brittleness of EVOH, the control of adequate reheat temperature is critical; as too low a temperature causes cracking of the EVOH layer, and too high a temperature excessively softens the sidewalls of the film as it is stretched, and especially the inner and outer layers, such as in a 3 layer structure, so that the bubble may burst from soft sidewalls. Thus the reheat temperature is carefully, and closely, controlled for each film, in order to optimize the possibility of successfully processing any given film structure.

Another critical factor in determining processability of a given film structure is the choice of materials for each layer. It has been found that materials in the EVOH blend layer and in the outer layer of the tube should preferably have a low effective melt index (EMI). Desirable materials typically have EMI's of 10 or less. Especially desirable materials for use in the EVOH blend layer have EMI's of 4 or less.

The term EMI is used to draw a relationship between the power consumption of an extruder processing a given polymer composition as compared to the power consumption of that same extruder when extruding low density polyethylene (LDPE). The EMI of the LDPE is taken to be identical to the melt flow index as measured by ASTM-D1238. In most cases there is a direct correlation between EMI and the melt flow index of the given polymer, as measured by ASTM-D1238. In some cases, though, such as with linear low density polyethylene, the EMI differs from the ASTM standard. Thus is the EMI defined by the actual in-extruder rheology of the process.

Alternatively, and particularly when a single-layer film is produced utilizing a less viscous polymer as the blend material, orientation may be effected by a conventional tentering operation, consisting in general of drawing roll sets and a tentering frame. Yet another possibility is uniaxial orientation as by fluid compression rolling. The choice of the particular orienting technique to be employed will depend on the nature and composition of the components and structure of the film to be produced, and will be apparent to those skilled in the art.

Compatibility of materials in the blends of, the oriented films of this invention, is initially judged according to the amounts of haze or opacity in the film, with significant amounts of haze or opacity being symptommatic evidence of incompatiblity. Other films considered incompatible are those exhibiting significant streaks or other non-uniformity at the bubble. Normally those films which exhibit good clarity and uniformity have compatible blends and are finally judged as barriers to oxygen transmission under the conditions of proposed use. On the other hand, a film may appear to have a compatible blend, on visual observation, while actually having discrete discontinuities in the barrier layer, discernable only by microscopic inspection; so that the barrier material is effectively by-passed, via the discontinuities, by oxygen transmitted through the film. Compatiblity is thus defined in terms of the oxygen barrier function, and usually is accompanied by good visual appearance.

While EMI has been found to be important to processability, compatibility has been found to be positively influenced by the presence in the EVOH blend layer of a molecular segment of the nature

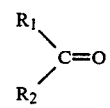

Many of the blends in this invention, for example, contain carboxylic acids, organic esters and organic anhydrides.

THE EVOH

The ethylene vinyl alcohol copolymer resins useful in this invention are essentially completely hydrolyzed and are generally extrudable. While partially hydrolyzed resins may be used, these generally do not provide the desired level of barrier to gaseous transmission, and are thus less preferred. Preferred ethylene vinyl alcohols are those having at least about 40 mole percent ethylene. Examples of preferred ethylene vinyl alcohols are EP-E, from Kuraray, with 45% ethylene and GL-E, from Nippon Gohsei, with 40% ethylene, both from Japan. Also acceptable for some applications are resins having lower ethylene content, such as Nippon Gohsei's GL-D at 29% ethylene and Kuraray's EP-F at 35% ethylene.

Melt flow indexes of the EVOH resins are measured according to ASTM-D1238 with 2160 gram load. EP-E and EP-F, measured at 190° C. are 5.8 and 1.5 respectively. GL-E and GL-D, measured at 210° C., are 8.0 and 7.4 respectively.

THE BLEND MATERIAL

The blend material usually has certain general characteristics. It typically contains olefinic type chains or chain segments, such as ethylene or propylene propylene. It has a low EMI, preferably below 4, and it has a double bonded carbon-oxygen linkage, herein referred to as a carboxy composition. It is notable that compatible blends of linear low density polyethylene (LLDPE) were successfully processed in the absence of the carbon-oxygen linkage—such linkages as carbonyls, anhydrides, carboxylic acids, and organic esters.

Blend materials successfully used in the EVOH blend layer include ethylene ethyl acrylate, ethylene acrylic acid, linear low density polyethylene, linear low density polyethylene copolymer, ionomer, anhydride modified polypropylene, anhydride modified ethylene vinyl acetate, anhydride modified low density polyethylene, anhydride modified medium density polyethylene, and anhydride modified high density polyethylene. Combinations of these, and other materials are also useful as the blend material; including partially hydrolyzed ethylene vinyl acetate.

The blend material is theorized to function in a plurality of interdependent activities. It serves as a dispersant by physically occupying space in the EVOH blend and physically serving as a partial shield protecting the EVOH from the presence of water, the EVOH being particularly sensitive to the presence of water, as is well known in the art. Those blend materials which have groups chemically active with the $-OH$ of EVOH, also serve to chemically inhibit activity between EVOH and water, so that the EVOH is less sensitive to the presence of moisture at the sites of the $-OH$ moieties. Finally, the blend material serves as an adulterant, to reduce the EVOH concentration, and thus reduces the effective amount of EVOH which is potentially encountered by an oxygen particle attempting to pass through the film.

The interaction of these elements is observed in the data, which was collected in tests in high moisture environments. An EVOH, such as GL-D, which has a high alcohol content, would normally be expected to provide an excellent oxygen barrier. In a dry environment, it does. The data, though, surprisingly show that it is very difficult to obtain acceptable oxygen barrier in the meat environment, because of the high sensitivity of the alcohol to environmental moisture. Conversely, EP-E, which has a low alcohol content, was successfully blended with a variety of blend materials at a wide range of blend ratios, and provided an excellent oxygen barrier. Thus it is the interaction of all the variables, including the environment, and several of them acting independently, which determines whether a given film structure can be produced, and whether that structure will provide an adequate barrier for the packaged product.

THE EVOH BLEND LAYER

The EVOH blend layer is a blend of the chosen EVOH and the selected blend material. The EVOH is present in an amount between about 40 mole percent and about 90 mole percent, with the blend material comprising the 10% to 60% balance of the layer composition. The lower limit of 40% EVOH is established as the minimum quantity required to provide an effective oxygen barrier. The lower limit of 10% of the blend material defines the minimum quantity of blend material normally required to perform its function and achieve the advantages of a blend.

The blend material has multiple functionality. It is generally accepted that EVOH, in many uses, provides substantially greater barrier to oxygen than is required by the packaged product. Thus, the blend material, being cheaper than EVOH, provides economy of cost by replacing some of the EVOH which would normally be present in that layer.

Secondly, the blend material appears to reduce the sensitivity of the EVOH to moisture. Meat packages typically operate with relative humidity in the range of 92% to 99% R.H. By reducing the sensitivity of the EVOH component to the humidity, the observed result is frequently an improved barrier as compared to a 100% EVOH layer. It will be appreciated that a 100% EVOH layer may not have a functionally acceptable oxygen barrier in the meat environment because of its sensitivity to the humidity associated with that environment. Thus, the blend material, although it dilutes the EVOH concentration, increases the efficiency of the EVOH in the moist environment by serving as a partial protection from that environment.

Thirdly, the blend material provides increased freedom of determination of the amount of EVOH used, and the thickness of the barrier layer in blown tube processes. It has been found that the thickness of a 100% EVOH layer in tubular processes is technically restricted by the process to a maximum thickness. In blends having substantial quantities of the blend material, no such technical limitation has been encountered. Beyond the minimum thickness required to establish the layer, the EVOH blend layer has been found to be generally unrestricted in layer thickness, the thickness thus being determined by economics, and desired product functional properties, rather than by technical processing restrictions.

In applications not involved with a high moisture environment, the above second recited advantage need not be considered. The other advantages, though, of course apply. Further, additional freedoms may then be exercised in the choice of the specific EVOH to be employed, since the differences in moisture sensitivity of the various EVOH materials in a moist environment are not relevant, and can be ignored.

THE INNER LAYER

Layer 114 represents the layer which is positioned on the inner surface of the extruded tube in the "double bubble" process. In the use of the film as a shrink film for meat shrink bags, layer 114 is used as the sealant layer; sealing to itself in a process activated either by the heat used to effect shrinkage of the film or by heat directed specifically at activating the self sealing heat seal properties of the material in layer 114. A representative process for self sealing a packaged product is shown in U.S. Pat. No. Re. 30,098. It should be appreciated that this process is illustrative only, of the function of layer 114.

Another desirable property of layer 114 is directly related to juxtaposition between the wet product and the moisture sensitive barrier layer 116. To the extent layer 114 has the property of functioning as a moisture barrier, it reduces the moisture concentration experienced by the barrier layer 116. With layer 116 thus exposed to lower moisture concentration, the oxygen barrier property of layer 116 is enhanced relative to that property when layer 116 is combined with a layer 114 composition of lesser moisture barrier.

While the composition of layer 114 is described herein as a heat sealable polymer, its composition may be selected with substantial freedom, depending on the intended use of the film.

In designing a film for a heat sealable shrink bag, it is desirable that layer 114 comprise a substantial portion of the thickness of film 100. In preferred structures layer 114 is at least 50% of the film thickness. While a variety of heat sealable polymer compositions are acceptable, a preferred composition is ethylene vinyl acetate (EVA) containing about 8% vinyl acetate (VA).

THE OUTER LAYER

Layer 112 represents the layer which is positioned on the outer surface of the tube in the double bubble process. During film production, and especially as the tube is stretched into a bubble, layer 112 provides a substantial portion of the strength used in resisting rupture of the bubble.

In the double bubble process, it has been found very difficult to establish a stable bubble when, in the combination of layers 112 and 116, the composition of layer 112 contains substantial amounts of EVOH, and the composition of layer 116 is, for example, an EVA containing 8% VA. When the compositions are reversed, however, so layer 112 does not contain substantial amounts of EVOH, and layer 116 does contain EVOH, a stable bubble may be readily established. The thickness of layer 112 is not critical, as the following data show successful operations with as little as 40 gauge thickness and as much as 120 gauge.

In the experiments disclosed herein it has been found that, if layers 112 and 114 are selected from materials susceptible to use in shrink films, layers 112 and 114 will control the ability of the film to function as a shrink film. Thus the choice of materials for use in layer 116 is generally not critical to the shrink function.

THE PROCESS

In the examples herein described, equipment common to the "double bubble" process was used to form the films. The resulting film was biaxially oriented, with a stretch factor of approximately 3/1 in each the with-machine direction and the cross-machine direction. Processability was judged subjectively based on the amount of difficulty encountered in establishing a stable bubble. The resulting films were judged subjectively according to clarity and uniformity. Finally, the samples of the film were tested for oxygen transmission at 73° F., 100% relative humidity (R. H.). It should be noted that each data point of oxygen transmission represents a single test; and multiple tests are reported as multiple data points.

THE EXAMPLES

Three-layer tubular film structures were formed as described in THE PROCESS. Example 1.154 is illustrative as follows. For the inner and outer layers, an EVA composition containing 8% VA was selected. For the blend layer 80 parts by weight of EP-E pellets of EVOH were dry blended with 20 parts by weight of XDR-4E ethylene acrylic acid pellets. The selected compositions were extruded through three extruders, and combined in a combining die to form a three layer, coextruded tube. The tube was cooled on its exterior surface, collapsed, and reheated to 210° F. The reheated tube was then passed through a pair of nip rolls and inflated into a bubble where it was biaxially oriented at about a 3/1 ratio in both the with-machine and cross-machine directions. The film was cooled and set by cooling air directed onto the exterior surface of the bubble. The bubble was then collapsed and wound up.

The resulting film was analyzed for layer structure and oxygen transmission, with the results as shown in Table 1. In numerical form, Table 1 shows that the inner layer was 222 gauge thick. The middle blend layer was 29 gauge, and the outer layer was 92 gauge. Oxygen transmission through the film was measured as 194 cm$^3$ per meter squared, 24 hours, at 73° F., 100% R. H.

All the films represented by the examples shown were formed in a similar manner, using the same polymer compositions on the inner and outer layers. Thus the compositions of the inner and outer layers are not shown; only their thicknesses.

Table 2 is a reference table showing the chemical nature of each of the polymers illustrated in the examples.

TABLE 1

| | | | | | | |
|---|---|---|---|---|---|---|
| | | | EXAMPLES | | | |
| Example No. | EVOH Copolymer In Blend | Blend Material In Blend | Blend Ratio[1] | Layer[2] Profile | O$_2$ Transmission | |
| | | | | | Absolute[3] | Per Mil EVOH |
| 1.154 | EP-E | XDR-4E | 80/20 | 222/29/92 | 194 | 45 |
| 2.148 | EP-E | XDR-4E | 60/40 | 169/40/83 | 329 | 79 |
| 3.155 | EP-E | XDR-4F | 80/20 | 126/17/77 | 163 | 22 |
| 4.149 | EP-E | XDR-4F | 60/40 | 117/32/92 | 479 | 92 |
| 5.131 | EP-E | 452 | 90/10 | 172/16/70 | 129 | 19 |
| 6.109 | EP-E | 452 | 80/20 | 130/15/59 | 214 | 26 |
| 7.108 | EP-E | 452 | 70/30 | 121/17/49 | 189 | 22 |
| 8.107 | EP-E | 452 | 60/40 | 147/30/70 | 211 | 38 |
| 9.129 | EP-E | 2045 | 90/10 | 130/14/49 | 267 | 34 |
| 10.103 | EP-E | 2045 | 80/20 | 139/22/76 | 149 | 26 |
| 11.102 | EP-E | 2045 | 70/30 | 139/32/63 | 199 | 45 |
| 12.101 | EP-E | 2045 | 60/40 | 169/41/120 | 169 | 42 |
| 13.089 | EP-E | 2045 | 50/50 | 109/21/45 | 259 | 27 |
| 14.089 | EP-E | 2045 | 50/50 | 174/34/64 | 209 | 36 |
| 15.088 | EP-E | Sclair 11P | 50/50 | 161/33/49 | 264 | 44 |
| 16.132 | EP-E | PL-1 | 90/10 | 126/10/40 | 217 | 20 |
| 17.095 | EP-E | PL-1 | 67/33 | 144/25/52 | 169 | 28 |
| 18.094 | EP-E | PL-1 | 50/50 | 122/30/62 | 284 | 43 |
| 19.133 | EP-E | PL-2197 | 90/10 | 223/18/101 | 109 | 18 |
| 20.133 | EP-E | PL-2197 | 90/10 | 184/23/75 | 125 | 26 |
| 21.165 | EP-E | PL-2197 | 85/15 | 140/21/78 | 276 | 49 |
| 22.166 | EP-E | PL-2197 | 80/20 | 129/16/64 | 209 | 27 |

TABLE 1-continued

EXAMPLES

| Example No. | EVOH Copolymer In Blend | Blend Material In Blend | Blend Ratio[1] | Layer[2] Profile | O$_2$ Transmission Absolute[3] | O$_2$ Transmission Per Mil EVOH |
|---|---|---|---|---|---|---|
| 23.167 | EP-E | PL-2197 | 75/25 | 126/17/77 | 219 | 28 |
| 24.168 | EP-E | PL-2197 | 70/30 | 114/25/60 | 182 | 32 |
| 25.093 | EP-E | PL-2197 | 50/50 | 133/23/64 | 309 | 35 |
| 26.000 | EP-E | PL-2109 | 90/10 | 175/16/59 | 184 | 26 |
| 27.000 | EP-E | PL-2109 | 80/20 | 164/16/71 | 234 | 30 |
| 28.000 | EP-E | PL-2109 | 70/30 | 141/10/68 | 519 | 36 |
| 29.130 | EP-E | QF-500 | 90/10 | 164/20/55 | 169 | 30 |
| 30.106 | EP-E | QF-500 | 80/20 | 133/24/60 | 153 | 29 |
| 31.105 | EP-E | QF-500 | 70/30 | 126/21/62 | 154 | 23 |
| 32.104 | EP-E | QF-500 | 60/40 | 146/14/61 | 264 | 22 |
| 33.092 | EP-E | QF-500 | 50/50 | 133/14/62 | 538 | 38 |
| 34.090 | EP-E | LF-500 | 50/50 | 175/28/71 | 243 | 34 |
| 35.091 | EP-E | NF-500 | 50/50 | 131/22/51 | 558 | 61 |
| 36.152 | GL-E | XDR-4E | 80/20 | 117/20/87 | 314 | 50 |
| 37.146 | GL-E | XDR-4E | 60/40 | 167/38/124 | 319 | 73 |
| 38.153 | GL-E | XDR-4F | 80/20 | 126/18/84 | 334 | 48 |
| 39.147 | GL-E | XDR-4F | 60/40 | 136/34/76 | 299 | 61 |
| 40.128 | GL-E | 452 | 90/10 | 152/12/76 | 219 | 24 |
| 41.124 | GL-E | 452 | 80/20 | 133/16/61 | 339 | 43 |
| 42.012 | GL-E | 452 | 75/25 | 116/06/53 | 579 | 26 |
| 43.012 | GL-E | 452 | 75/25 | 99/07/48 | 599 | 31 |
| 44.012 | GL-E | 452 | 75/25 | 115/06/67 | 599 | 27 |
| 45.012 | GL-E | 452 | 75/25 | 110/06/59 | 608 | 27 |
| 46.012 | GL-E | 452 | 75/25 | 129/20/58 | 254 | 38 |
| 47.120 | GL-E | 452 | 70/30 | 117/21/69 | 559 | 82 |
| 48.116 | GL-E | 452 | 60/40 | 138/30/76 | 499 | 90 |
| 49.027 | GL-E | 452 | 50/50 | 162/40/71 | 279 | 56 |
| 50.126 | GL-E | 2045 | 90/10 | 186/17/11 | 204 | 31 |
| 51.122 | GL-E | 2045 | 80/20 | 166/30/116 | 324 | 78 |
| 52.118 | GL-E | 2045 | 70/30 | 237/32/158 | 418 | 94 |
| 53.086 | GL-E | 2045 | 50/50 | 84/16/61 | 1500+ | 120+ |
| 54.000 | GL-E | 8231 | 50/50 | 108/54/62 | 519 | 140 |
| 55.000 | GL-E | 8231 | 50/50 | 151/90/92 | 327 | 147 |
| 56.000 | GL-E | 657 | 75/25 | 166/42/84 | 216 | 68 |
| 57.000 | GL-E | 657 | 75/25 | 102/30/54 | 309 | 70 |
| 58.125 | GL-E | PL-1 | 90/10 | 190/23/118 | 194 | 40 |
| 59.121 | GL-E | PL-1 | 80/20 | 136/17/80 | 254 | 35 |
| 60.117 | GL-E | PL-1 | 70/30 | 143/28/55 | 339 | 66 |
| 61.113 | GL-E | PL-1 | 60/40 | 158/29/72 | 269 | 47 |
| 62.081 | GL-E | PL-1 | 50/50 | 182/10/92 | 609 | 30 |
| 63.127 | GL-E | PL-2197 | 90/10 | 201/22/102 | 209 | 41 |
| 64.123 | GL-E | PL-2197 | 80/20 | 182/20/90 | 232 | 37 |
| 65.119 | GL-E | PL-2197 | 70/30 | 189/29/102 | 229 | 46 |
| 66.115 | GL-E | PL-2197 | 60/40 | 175/23/95 | 389 | 54 |
| 67.000 | GL-E | PL-2109 | 90/10 | 178/9/56 | 339 | 27 |
| 68.085 | GL-E | QF-500 | 50/50 | 147/25/21 | 538 | 67 |
| 69.083 | GL-E | LF-500 | 50/50 | 117/22/68 | 879 | 97 |
| 70.084 | GL-E | NF-500 | 50/50 | 126/23/70 | 619 | 71 |
| 71.161 | GL-ET | XDR-4E | 80/20 | 124/16/63 | 294 | 38 |
| 72.160 | GL-ET | 2045 | 80/20 | 167/18/97 | 229 | 33 |
| 73.159 | GL-ET | PL-2197 | 80/20 | 125/14/88 | 254 | 28 |
| 74.156 | EP-F | XDR-4E | 80/20 | 144/22/71 | 459 | 81 |
| 75.150 | EP-F | XDR-4E | 60/40 | 136/20/85 | 638 | 77 |
| 76.157 | EP-F | XDR-4F | 80/20 | 152/26/101 | 388 | 81 |
| 77.151 | EP-F | XDR-4F | 60/40 | 143/18/60 | 999 | 108 |
| 78.052 | EP-F | 2045 | 50/50 | 137/30/71 | 329 | 49 |
| 79.056 | EP-F | QF-500 | 50/50 | 134/09/62 | 279 | 13 |
| 80.056 | EP-F | QF-500 | 50/50 | 150/13/67 | 272 | 18 |
| 81.057 | EP-F | NF-500 | 50/50 | 102/20/60 | 353 | 35 |
| 82.054 | EP-F | PL-2 | 50/50 | 116/18/64 | 334 | 30 |

[1]EVOH Copolymer/Blend Material, Percent
[2]Gauge Thickness, in sequence: Inner Layer/Blend Layer/Outer Layer
[3]cm$^3$ mil/meter$^2$ 24 hr. at 73° F., 100% Relative Humidity

TABLE 2

MATERIALS IN BLEND LAYER

| EVOH and Blend Material Designations | Chemical Nature | Melt Index ASTM-D1238 |
|---|---|---|
| XDR-4E | EAA, 5.1% AA | 0.5 |
| XDR-4F | EAA, 8.2% AA | 1.1 |
| 452 | EAA, 6.5% AA | 2.0 |
| 2045 | LLDPE | 1.0 |
| Sclair 11P | LLDPE copolymer | 0.7 |
| 8231 | Ionomer | 5.0 |
| 657 | EVA | 0.5 |
| PL-1 | Anhydride Modified EVA | 1.0 |
| PL-2197 | Anhydride Modified PP | 2.0 |
| PL-2109 | Anhydride Modified PP | 1.2 |
| QF-500 | Anhydride Modified PP | 4.7 |
| LF-500 | Anhydride Modified LDPE | 1.2 |

TABLE 2-continued

MATERIALS IN BLEND LAYER

| EVOH and Blend Material Designations | Chemical Nature | Melt Index ASTM-D1238 |
|---|---|---|
| NF-500 | Anhydride Modified MDPE | 2.0 |
| PL-2 | Anhydride Modified HDPE | 0.9 |
| EP-E | EVOH - 45% ethylene | 5.8 at 190° C. |
| GL-E | EVOH - 40% ethylene | 8.0 at 210° C. |
| GL-ET | EVOH - 40% ethylene | 3.5 at 210° C. |
| EP-F | EVOH - 35% ethylene | 1.5 at 190° C. |
| GL-D | EVOH - 29% ethylene | 7.4 at 210° C. |

EAA = ethylene acrylic acid
LLDPE = linear low density polyethylene
EVA = ethylene vinyl acetate
PP = polypropylene
LDPE = low density polyethylene
MDPE = medium density polyethylene
HDPE = high density polyethylene

THE TESTING

The function of EVOH as a barrier to transmission of oxygen through a film is conventionally analyzed on a MoCon oxygen analyzer, at conditions of 73° F. and 0% R. H. It has been found, by testing of packaged product, that this test is not necessarily indicative of the ability of the film to impede oxygen transmission at the conditions prevalant in the meat holding environment. Typical conditions normally encountered in this environment are 38° F., 99% R. H. on the inside of the package, and 92% R. H. on the outside of the package. The significance of the environment is that EVOH is generally very sensitive to high relative humidity, and the degree of sensitivity cannot be predicted by testing at low humidity.

It has been found, by actual tests on packaged meat, that the oxygen barrier function of the film in the meat environment can be predicted with reasonable accuracy by measuring the oxygen transmission on a MoCon oxygen analyzer at 73° F. and 100% R. H. 100% R. H. is obtained by placing a moist pad on the film during the test. It has been found that, if the absolute oxygen transmission at these conditions is equal to or less than 350 cubic centimeters, per square meter of surface area, during a twenty-four hour period, the film is capable of adequately protecting meat from oxygen infusion in the meat environment. Thus, the majority of the test data was obtained at these conditions. Some films having transmission rates above 350 at these conditions also provide adequate protection; but additional testing is required to confirm each film. With the information disclosed herein, one skilled in the art will be able to perform those tests.

Several of the examples listed fail to satisfy the 350 $cm^3$ parameter, but indicate by their structure, minor structural changes which could be expected to yield the desired parameter. Illustrative of this are Examples 42.012 through 45.012, which have very thin blend layers. Example 46.012 is a similar structure with thicker blend layer and fully adequate barrier. Thus do the examples themselves indicate modifications which will provide desirable films for given package environments.

A single data point, at meat holding conditions, is shown by Example 83 in Table 3, which is a re-test of film from Examples 19.133 and 20.133. The 19.133 data is repeated in Table 3 for comparison. Table 3 thus illustrates the relationship between oxygen transmissions at 73° F., 100% R. H. and transmissions in the meat environment described. The humidity on both sides of the film was separately controlled, as noted in Table 3. A salient feature of Table 3 and Example 83 is that the film having the EVOH blend as the barrier layer was much less sensitive to change in R. H., at high levels, than the film having 100% EVOH as the barrier layer.

TABLE 3

OXYGEN TRANSMISSION IN THE MEAT ENVIRONMENT

| Test Conditions | | | Blend Layer Identification | | |
|---|---|---|---|---|---|
| | Relative Humidity | | Controls | | Example 83 |
| Temperature °F. | Outside Layer | Inside Layer | 100% EP-E | 100% GL-E | 90% EP-E, 10% 2197 |
| 73 | 100 | 100 | — | — | 109 |
| 38 | 92 | 99 | 20 | 11 | 10 |
| 38 | 100 | 100 | 38 | 73 | 13 |

For use in a moist environment the 350 $cm^3$ requirement is important. However, films having substantially higher transmission rates at 100% R. H. may be acceptable for use with other product applications; and these films may appropriately be tested for oxygen transmission rates at low R. H. Thus the invention is not to be limited to the 350 $cm^3$ transmission, but rather should be considered in terms of processability of the film, and compatibility of the EVOH blend, in combination with an acceptable barrier to oxygen transmission at some environment typically encountered in commerce. For example, the blends herein disclosed may desirably be used in dry environments, such as for the packaging of dry snack foods. In such applications, moisture sensitivity is of no consequence; and blends and structures which fail to provide acceptable oxygen barrier at high relative humidity may in fact function superbly. For example, film structures using blends with GL-D EVOH are generally too moisture-sensitive for use with high humidity. They are, however, superbly adapted, by their high alcohol content, and may generally be preferred, for use with dry products.

While all the examples shown herein are three layer structures, this invention may be practiced, within the foregoing description, with fewer layers, or more layers in the structure; the exact number of layers, and the structure being determinable by those skilled in the art, and depending on the anticipated end usage of the film.

Having thus described the invention, what is claimed is:

1. An oriented multiple layer polymeric film, comprising:
    (a) a first layer, the composition of said first layer being a blend of greater than 40% by weight of an EVOH copolymer and less than 60% of a blend material, the composition of said blend material being chosen from the group consisting of ethylene ethyl acrylate, ethylene acrylic acid, linear low density polyethylene, anhydride modified polypropylene, anhydride modified ethylene vinyl acetate, anhydride modified low density polyethylene, anhydride modified medium density polyethylene, anhydride modified high density polyethylene, partially hydrolyzed ethylene vinyl acetate and blends of said above recited polymers and copolymers, said first layer, in the oriented state, comprising a compatible blend composition; and
    (b) a second polymeric layer in face to face contact with said first layer.

2. An oriented film as in claim 1 wherein said EVOH copolymer is at least about 35% ethylene.

3. An oriented film as in claim 1 wherein said first layer is between said about 5 gauge and about 50 gauge thickness.

4. An oriented film as in claim 1 wherein said blend material contains carboxy groups.

5. An oriented film as in claim 2 wherein said blend material contains carboxy groups.

6. An oriented film as in claim 4 wherein said carboxy groups comprise at least 0.5% of said blend material.

7. An oriented film as in claim 5 wherein said carboxy groups comprise at least 0.5% of said blend material.

8. An oriented film as in claim 1 wherein said blend material has a melt index, compared to LDPE, of no more than about 10.

9. An oriented film as in claim 5 wherein said blend material has a melt index, compared to LDPE, of no more than about 10.

10. An oriented film as in claim 1 wherein the composition of said second layer is chosen from the group consisting of ethylene vinyl acetate, high density polyethylene, low density polyethylene, ethylene propylene copolymer, and linear low density polyethylene.

11. An oriented film as in claim 2 wherein the composition of said second layer is chosen from the group consisting of ethylene vinyl acetate, high density polyethylene, low density polyethylene, ethylene propylene copolymer and linear low density polyethylene.

12. An oriented film: as in claim 1 wherein said blend material has a melt index, compared to LDPE, of no more than about 4, and wherein the composition of said second layer is chosen from the group consisting of ethylene vinyl acetate, polypropylene, high density polyethylene, low density polyethylene, ethylene propylene copolymer, and linear low density polyethylene.

13. An oriented film as in claim 2 wherein said blend material has a melt index, compared to LDPE, of no more than about 4, and wherein the composition of said second layer is chosen from the group consisting of ethylene vinyl acetate, polypropylene, high density polyethylene, low density polyethylene, ethylene propylene copolymer, and linear low density polyethylene.

14. An oriented film as in claim 3 wherein said blend material has a melt index, as compared to LDPE, of no more than about 4, and wherein the composition of said second layer is chosen from the group consisting of ethylene vinyl acetate, polypropylene, high density polyethylene, low density polyethylene, ethylene propylene copolymer, and linear low density polyethylene.

15. An oriented film as in claim 1 wherein said blend material contains carboxyl groups and has a melt index, compared to LDPE, of no more than about 4, and wherein said second layer is an ethylene vinyl acetate copolymer.

16. An oriented film as in claim 2 wherein said blond material contains carboxyl groups and has a melt index, compared to LDPE, of no more than about 4, and wherein said second layer is an ethylene vinyl acetate copolymer.

17. An oriented film as in claim 3 wherein said blend material contains carboxyl groups and has a melt index, compared to LDPE, of no more that about 4, and wherein said second layer is an ethylene vinyl acetate copolymer.

18. An oriented film as in claim 9 wherein said carboxy groups are in the form of anhydride.

19. An oriented multiple layer film, comprising:

(a) a first layer, the composition of said first layer being a blend of greater than 40% and less than 100%, of an EVOH copolymer and greater than 0%, and less than 60%, of a blend material, the composition of said blend material being chosen from the group consisting of ethylene ethyl acrylate, ethylene acrylic acid, linear low density polyethylene, anhydride modified polypropylene, anhydride modified ethylene vinyl acetate, anhydride modified low density polyethylene, anhydride modified medium density polyethylene, anhydride modified high density polyethylene, partially hydrolyzed ethylene vinyl acetate, and blends of said above recited polymers and copolymers, said first layer, in the oriented state, comprising a compatible blend composition; and (b) second and third polymeric layers in face to face contact with said first layer, on opposing surfaces of said first layer.

20. An oriented film as in claim 19 wherein said film has a total thickness of between 1.5 mils and 3 mils, said third layer comprises ethylene vinyl acetate copolymer, and wherein at least 50% of the thickness of said film comprises said third layer.

21. An oriented film as in claim 19 wherein said second layer comprises ethylene vinyl acetate copolymer.

22. An oriented film as in claim 19 wherein said third layer functions as a moisture barrier, to reduce the moisture concentration experienced by said first layer to a level less than the concentration experienced by the surface of said film, which surface is represented by said third layer.

23. An oriented film as in claim 1, wherein the composition of said blend material includes, as a molecular segment, a moiety of

24. An oriented film as in claim 23 wherein $R_2$ is connected to the carbon atom through an oxygen linkage.

25. An oriented film as in claim 24 wherein $R_1$ is aliphatic.

26. An oriented multiple layer polymeric film, comprising:

(a) a first layer, having two surfaces, the composition of said first layer being a blend, said blend consisting essentially of (i) a first component of an EVOH copolymer and (ii) a second component of a blend material, said blend material being chosen from the group consisting of ethylene ethyl acrylate, ethylene acrylic acid, linear low density polyethylene, ionomer, anhydride modified polypropylene, anhydride modified ethylene vinyl acetate, anhydride modified low density polyethylene, anhydride modified medium density polyethylene, anhydride modified high density polyethylene, and partially hydrolyzed ethylene vinyl acetate;

said first component of EVOH comprising greater than 40% and less than 100% of said blend and said second component comprising greater than 0% and less than 60% of said blend, said first layer, in the oriented state, comprising a compatible blend composition; and (b) a second polymeric layer in face-to-face contact with said first layer on one of said surfaces thereof.

27. An oriented multiple layer polymeric film as in claim 26 and including a third polymeric layer in face-to-face contact with said first layer on the other said surface thereof, such that said second and third layers are on opposing surfaces of said first layer.

28. An oriented multiple layer polymeric film as in claim 27 wherein the composition of said third layer includes, as a component thereof, EVOH.

29. An oriented multiple layer polymeric film as in claim 19 wherein the composition of said third layer includes, as a component thereof, EVOH.

* * * * *